(12) United States Patent
Maeno

(10) Patent No.: US 6,941,296 B2
(45) Date of Patent: Sep. 6, 2005

(54) INTERNET SEARCH SUPPORTING APPARATUS AND METHOD, AND INTERNET SEARCH SUPPORTING PROGRAM USING THE METHOD

(75) Inventor: Kazuhiro Maeno, Otsu (JP)

(73) Assignee: Fujitsu Limited, Kawasaki (JP)

( * ) Notice: Subject to any disclaimer, the term of this patent is extended or adjusted under 35 U.S.C. 154(b) by 398 days.

(21) Appl. No.: 10/200,159

(22) Filed: Jul. 23, 2002

(65) Prior Publication Data

US 2003/0149688 A1 Aug. 7, 2003

(30) Foreign Application Priority Data

Feb. 6, 2002 (JP) ........................................ 2002-029145

(51) Int. Cl.[7] .............................................. G06F 17/30
(52) U.S. Cl. ..................... 707/3; 707/5; 707/8; 707/10; 707/102; 707/104.1; 709/202; 709/203; 709/225; 709/229
(58) Field of Search .............................. 707/2–5, 8, 10, 707/102, 104.1, 103, 103 R; 709/202, 203, 219, 225, 224, 229; 718/102; 713/200

(56) References Cited

U.S. PATENT DOCUMENTS

| | | | | |
|---|---|---|---|---|
| 6,012,083 A | * | 1/2000 | Savitzky et al. | ............ 709/202 |
| 6,092,074 A | * | 7/2000 | Rodkin et al. | ............... 707/102 |
| 6,092,100 A | * | 7/2000 | Berstis et al. | ................ 709/203 |
| 6,363,398 B1 | * | 3/2002 | Andersen | ................. 707/103 R |
| 6,366,906 B1 | | 4/2002 | Hoffman | |
| 6,480,837 B1 | * | 11/2002 | Dutta | ............................. 707/3 |
| 6,526,402 B2 | * | 2/2003 | Ling | .............................. 707/3 |
| 6,549,941 B1 | * | 4/2003 | Jaquith et al. | ............... 709/219 |
| 6,675,261 B2 | * | 1/2004 | Shandony | .................... 711/121 |
| 6,816,871 B2 | * | 11/2004 | Lee | ........................... 707/104.1 |

FOREIGN PATENT DOCUMENTS

JP         2001-43244        2/2001

* cited by examiner

*Primary Examiner*—Charles Rones
*Assistant Examiner*—Jacques Veillard
(74) *Attorney, Agent, or Firm*—Staas & Halsey LLP

(57) ABSTRACT

A character string input in a URL input region of a browser is obtained. An HTTP request is sent, and a return code with respect thereto is confirmed. In the case where the return code is not a predetermined one, a search request is sent to a predetermined search engine. Registered search engines are extracted in the order from a high priority, and whether or not the search request has been sent to all the registered search engines is determined. Then, the search request is continued to be sent to the search engines in the order from a high priority until it is determined that the search request has been sent to all the search engines.

9 Claims, 7 Drawing Sheets

INTERNET SEARCH SUPPORTING APPARATUS AND METHOD, AND INTERNET SEARCH SUPPORTING PROGRAM USING THE METHOD

BACKGROUND OF THE INVENTION

1. Field of the Invention

The present invention relates to a search supporting apparatus and method using a browser for a search in an Internet environment, and a recording medium storing a program for an Internet search supporting method.

2. Description of the Related Art

Along with the rapid establishment of a communication environment, an Internet environment is widely spreading to households as well as corporations. The amount of information provided in the Internet environment is large, and there are various kinds of contents to be provided.

A user is required to retrieve and utilize information necessary to the user from such a large amount of information. Therefore, the most significant target for utilizing the Internet is to establish a method for allowing the user to reach necessary information rapidly and exactly.

In order to achieve the above-mentioned target, each browser provided in the Internet environment allows users to be easily connected to search sites provided by a plurality of vendors; thus, it is designed that user's needs such as speedup of an information search are satisfied even slightly.

For example, in a Netscape browser provided by Netscape Communications Corp., which is a typical browser, when a user inputs a URL (uniform resource locator) of a search site by key-in, clicking of a mouse, or the like, the entire screen that is being browsed is switched to a display screen of the search site.

However, according to the above-mentioned method, it is required to generate a frame for connection to a search site on a display screen region. This is likely to relatively reduce the display screen region for browsing. Thus, there is a constraint in the display screen region every time information is searched for, which results in loss of visibility.

Furthermore, it is not important for the user which search engine the user is using. More specifically, the user can be satisfied sufficiently as long as the information necessary to the user is obtained, irrespective of which search site is being connected. Thus, according to a conventional method that requires the user to intentionally select a search engine when the user desires to search for information, it is required for the user to successively change search engines intentionally until the user obtains necessary information. This imposes a large load on the user.

Furthermore, in the case where the specification of a search character string peculiar to a search engine is changed in accordance with the upgrade or change in specification of the search engine itself, when the search engine is continuously used, it is required for the user to alter a search character string in accordance with the change. Thus, it is required for the user to keep the specification of a search character string to be input in accordance with the specification of the search engine. This also imposes a large load on the user.

SUMMARY OF THE INVENTION

Therefore, with the foregoing in mind, it is an object of the present invention to provide an Internet search supporting apparatus and method that allows a user to search for information without being aware of a search site, while keeping a browsing screen in a normal state in the course of an Internet search, and a recording medium storing a program for an Internet search supporting method.

In order to achieve the above-mentioned object, an Internet search supporting apparatus of the present invention includes: a URL input character string sending part for obtaining a character string input in a URL input region and sending an HTTP (Hypertext Transfer Protocol) request in a browser using an Internet search; a first return code confirming part for confirming a return code with respect to the HTTP request; a search script generating part for automatically generating a search script corresponding to a search engine based on the obtained character string; and a search request sending part for generating a search request using the generated search script, and sending the search request to the search engine, wherein, only in a case where the return code with respect to the HTTP request is not a predetermined return code in the first return code confirming part, the search request is sent to the search engine in the search request sending part.

According to the above-mentioned configuration, an HTTP request is issued unconditionally based on only the character string input in the URL input region in the case where a search is conducted using the Internet, whereby whether or not a search is a web page search or a character string search can be determined in accordance with a return code. Therefore, it is not required to provide character string input regions separately for a web page display and a web page search, and it is not required to switch a search screen. Thus, a search operation can be simplified. Furthermore, it also becomes possible to reduce the load of processing of generating a search script corresponding to a search engine by the user.

Furthermore, it is preferable that an Internet search supporting apparatus of the present invention includes: a search engine extracting part for referring to a search engine registration database in which a plurality of the search engines are registered, and extracting the registered search engines; a second return code confirming part for confirming a return code with respect to the search request; and a search request confirming part for determining whether or not the search request has been sent to all the search engines registered in the search engine registration database, wherein the search requests are continued to be sent to the search engines in the order from a high priority in the search request sending part until it is determined in the search request confirming part that the search requests have been sent to all the search engines registered in the search engine registration database. This is because a user can search for information with respect to all the previously specified search engines without being aware of a search engine.

Furthermore, the present invention is characterized by a recording medium storing software for executing the function of the above-mentioned Internet search supporting apparatus as processing operations of a computer. More specifically, the present invention is characterized by a method for supporting an Internet search including: obtaining a character string input in a URL input region and sending an HTTP request in a browser using an Internet search; confirming a return code with respect to the HTTP request; automatically generating a search script corresponding to a search engine based on the obtained character string; and generating a search request using the generated search script, and sending the search request to the search engine, wherein, only in a case where the return code with respect to the HTTP request is not a predetermined return code, the search request is sent to the search engine. The present invention is also characterized by a recording medium storing a computer executable program for realizing the above processes.

According to the above-mentioned configuration, when the above-mentioned program is loaded onto a computer for execution, an HTTP request is issued unconditionally based on only the character string input in the URL input region in the case where a search is conducted using the Internet, whereby whether or not a search is a web page search or a character string search can be determined in accordance with a return code. Therefore, it is not required to provide character string input regions separately for a web page display and a web page search, and it is not required to switch a search screen. Thus, an Internet search supporting apparatus can be realized in which a search operation can be simplified.

These and other advantages of the present invention will become apparent to those skilled in the art upon reading and understanding the following detailed description with reference to the accompanying figures.

DESCRIPTION OF THE PREFERRED EMBODIMENTS

Figure 1:
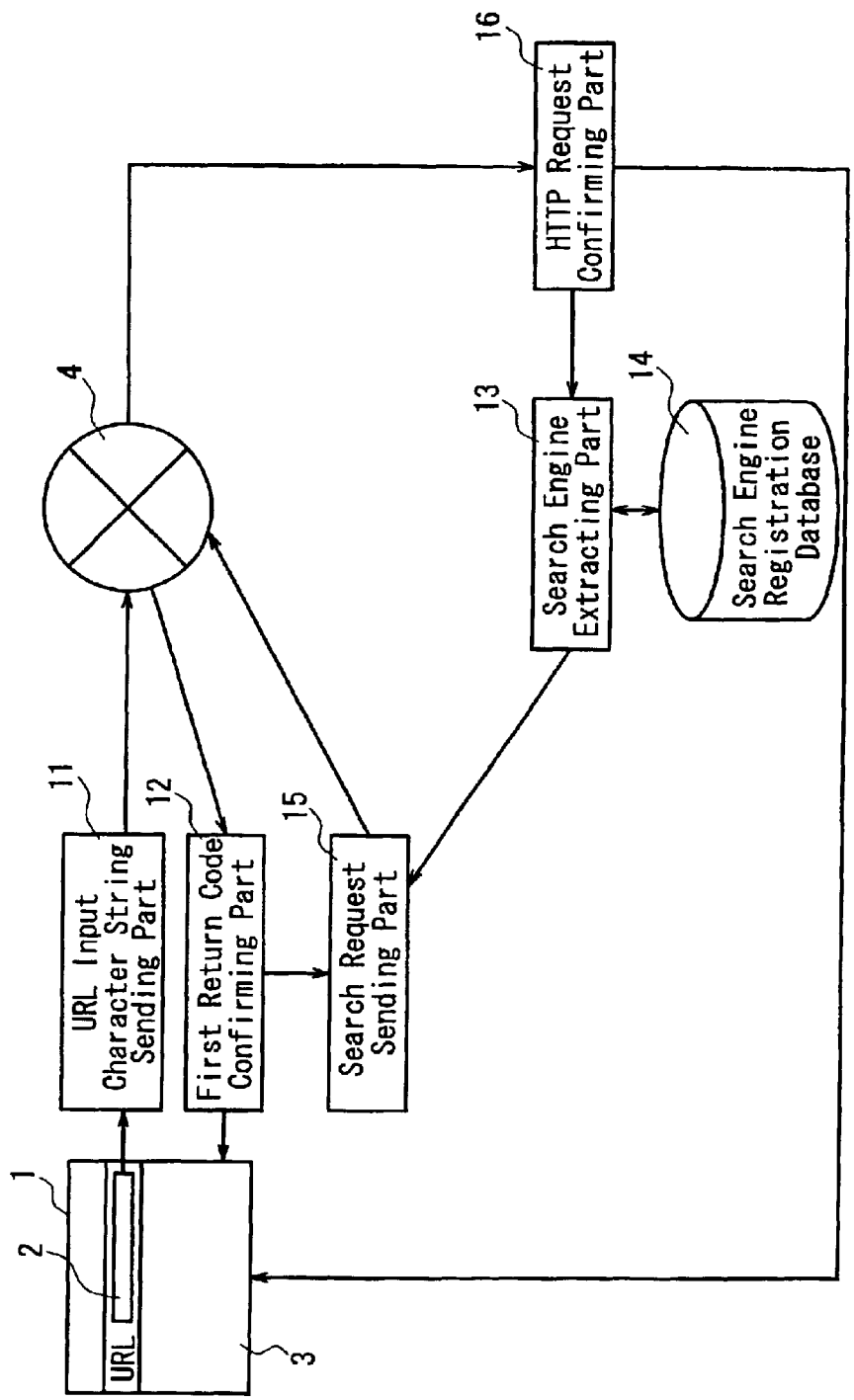
FIG. 1 is a view showing a configuration of an Internet search supporting apparatus of an embodiment according to the present invention.

Hereinafter, an Internet search supporting apparatus and method of an embodiment according to the present invention will be described with reference to the drawings. FIG. 1 is a view showing a configuration of the Internet search supporting apparatus of the embodiment according to the present invention. In the present embodiment, the case where the Internet search supporting apparatus of the present invention is incorporated in a browser used for the Internet will be described.

In FIG. 1, reference numeral 1 denotes a general browser screen on a personal computer, 2 denotes a URL name input region, and 3 denotes a web page display region.

Reference numeral 4 denotes the Internet that receives an HTTP request for searching for a URL name input in the browser. In general, a return code representing a "normal return" or an "abnormal return" is returned to the HTTP request. More specifically, in the case where the return code represents a "normal return", a web page corresponding to the input URL name is displayed on the web page display region 3.

The kind of the return code is not limited to the above examples. The return code may be any possible codes. Furthermore, it is assumed that a user selects a plurality of search engines, and these engines are previously registered with the order of priority.

Reference numeral 11 denotes a URL input character string sending part for extracting a character string input in the URL name input region 2 of the browser and sending it as an HTTP request. As a character string to be input in the URL name input region 2, a search prompt as well as a URL name of a web page which a user desires to display can be directly input.

Thus, even in the case where an information search is conducted, a search prompt representing a search condition uses only the URL name input region 2, and does not hinder a display in the web page display region 3.

Reference numeral 12 denotes a first return code confirming part for confirming a return code with respect to the HTTP request sent from the URL input character string sending part 11. A return code representing a "normal return" in the first return code confirming part 12 means that a web page corresponding to a URL name has been found, and the corresponding web page is displayed in the web page display region 3.

A return code representing an "abnormal return" in the first return code confirming part 12 means that a web page corresponding to a URL name has not been found, and it is determined that a character string input in the URL name input region 2 of the browser is not a URL name, but a search character string corresponding to either of the search engines.

Furthermore, it is considered that, during a search, a user successively selects search engines in the order from a high priority previously specified by the user. More specifically, in a search engine extracting part 13, search engines are extracted in the order from a high priority from a search engine registration database 14 in which a plurality of search engines are previously registered with the order of priority specified by the user, and based on a search script generated in accordance with the character string input in the URL name input region 2 of the browser, the presence of intended information is confirmed by using each search engine.

Figure 2:
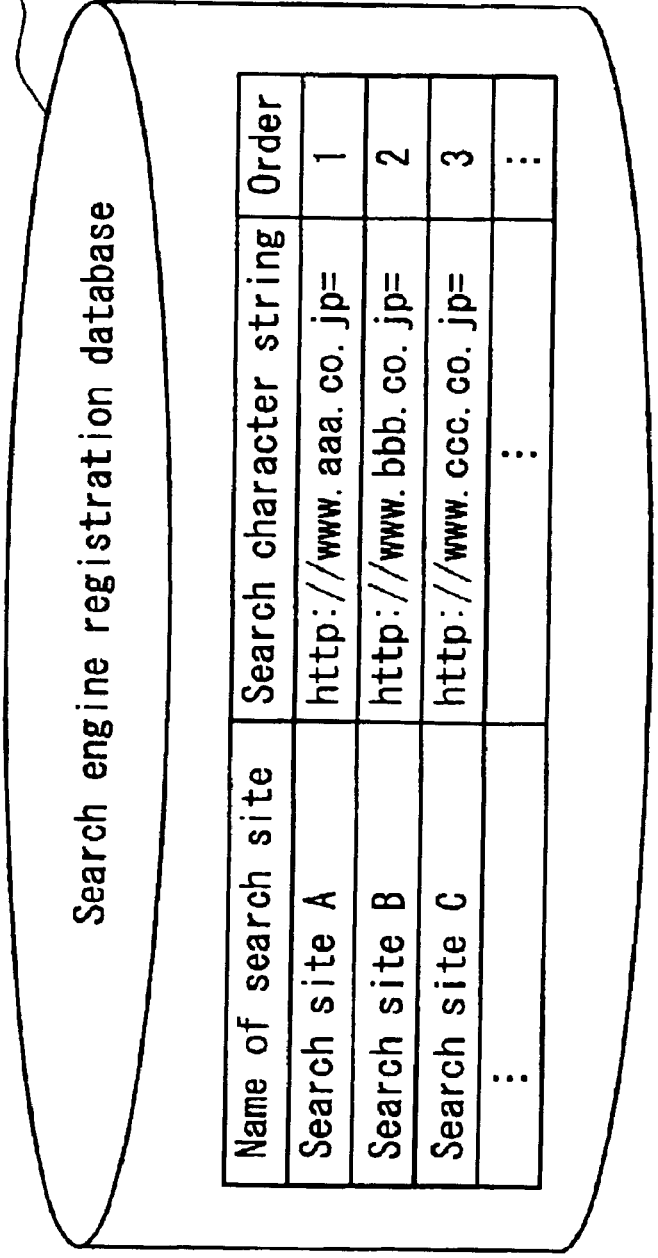
FIG. 2 is a view illustrating a data configuration of a search engine registration database in the Internet search supporting apparatus of the embodiment according to the present invention.

FIG. 2 is a view illustrating a data configuration of the search engine registration database 14 in the Internet search supporting apparatus of the embodiment according to the present invention. As shown in FIG. 2, each search engine is registered as a group of record with a search script in the order from a high priority. In a search request sending part 15 (described later), a search request is automatically generated based on such a search script and sent. Needless to say, the data configuration is not particularly limited thereto.

Because of the above configuration, a search can be conducted successively in the order from a high priority specified by the user, and the user is not required to be aware of which search engine is being used.

Then, the search request sending part 15 sends a search request to the search site using each search engine via the Internet 4. The search request includes an address of a search site that is a destination, and a search script and a search character string corresponding to the search site. The search request is generated with reference to the search engine registration database 14.

In the case where only one search engine is used, it is also considered that a search request is directly generated as a logic of a program without referring to the search engine registration database 14.

Figure 3:
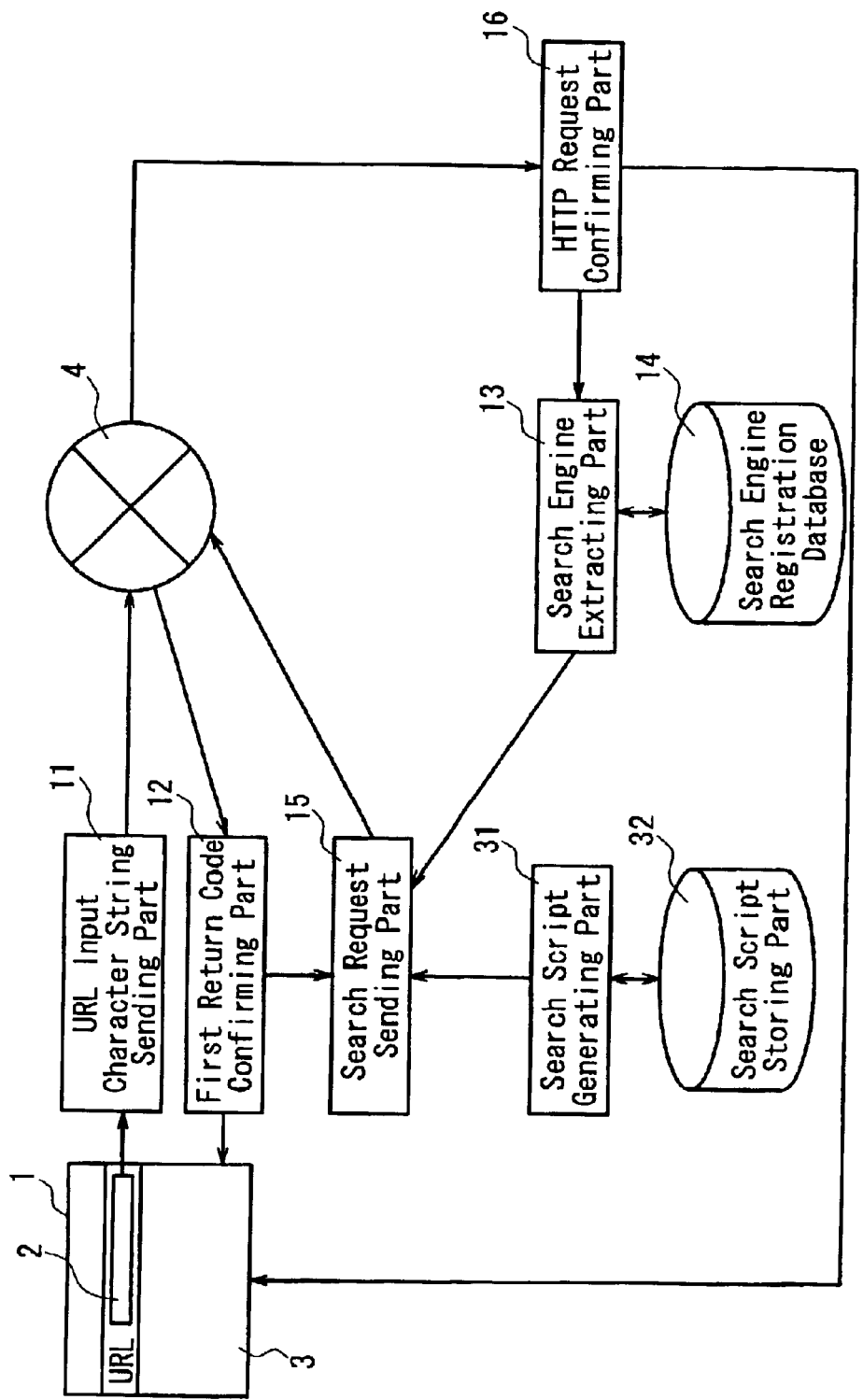
FIG. 3 is a view showing a configuration of an Internet search supporting apparatus of an example according to the present invention.

Furthermore, in the case where a search script is not registered as data in the search engine registration database 14, the following can also be considered. A search script generating part 31 and a search script storing part 32 are separately provided as shown in FIG. 3, whereby a search engine is extracted and a search script corresponding thereto can be generated, or a search script that has already been generated can be read out. More specifically, automatic generation of a search script and transmission of a search request are separated, whereby it is attempted to omit the load of processing of generating a search script, if not required, and to reduce a processing load in each module.

Figure 4:
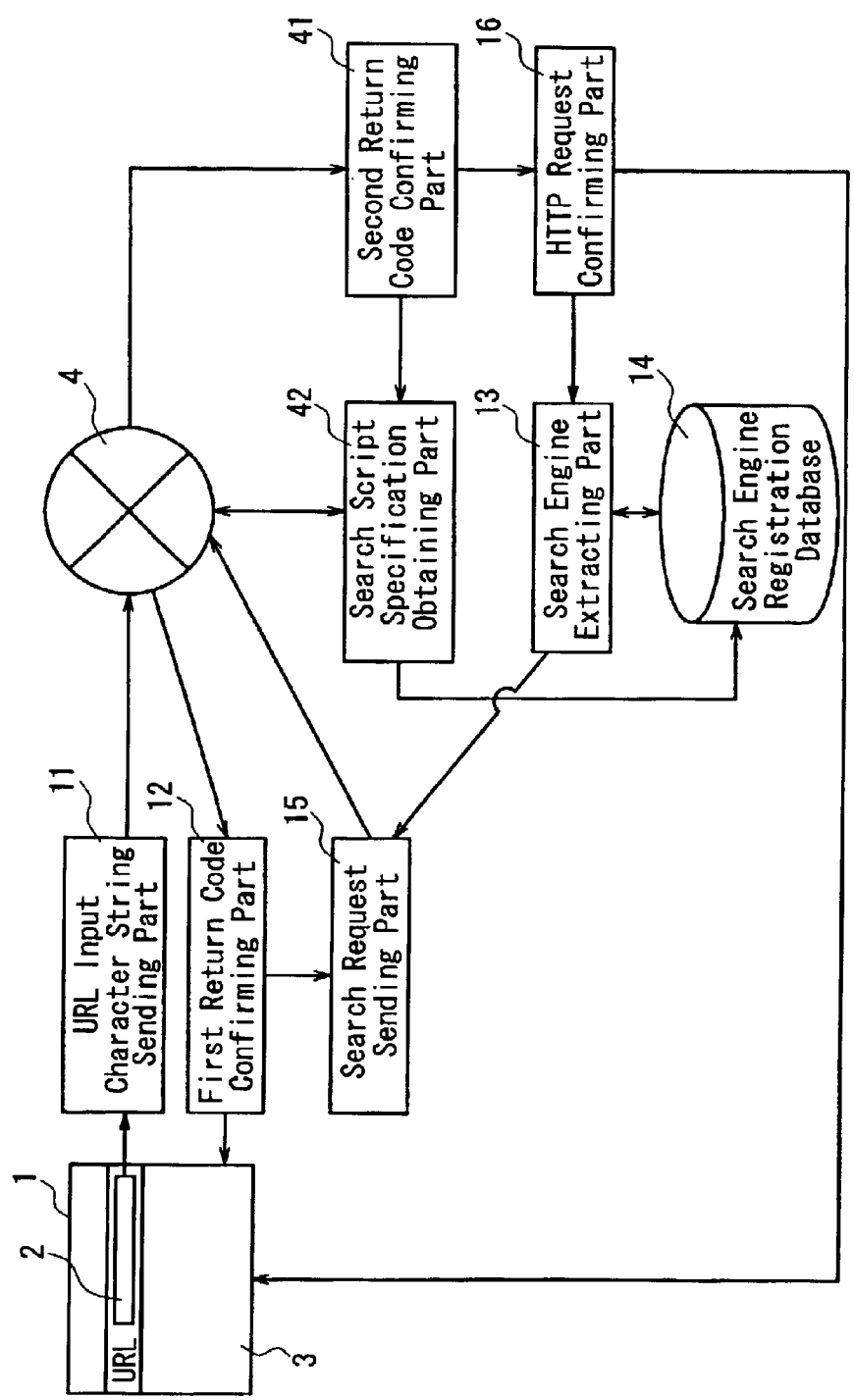
FIG. 4 is a view showing a configuration of an Internet search supporting apparatus of another example according to he present invention.

Furthermore, the specification of a search script may be changed due to the alteration of a URL name, upgrade, release-up, or the like on the search engine side. In this case, in order to obtain the changed specification of a search script, a second return code confirming part 41 is provided as shown in FIG. 4 so as to confirm a return code from each search site with respect to a search request containing a search prompt. In the case where a return code represents an "abnormal return", it is determined that the sent search script does not correspond to the search script whose specification has been changed in the search engine.

In a search script specification obtaining part 42, the changed specification of the search script is obtained from each search site, and stored in the search engine registration database 14 or the search script storing part 32. Because of this, a search request can be sent in accordance with the changed specification of a search script subsequently.

Figure 5:
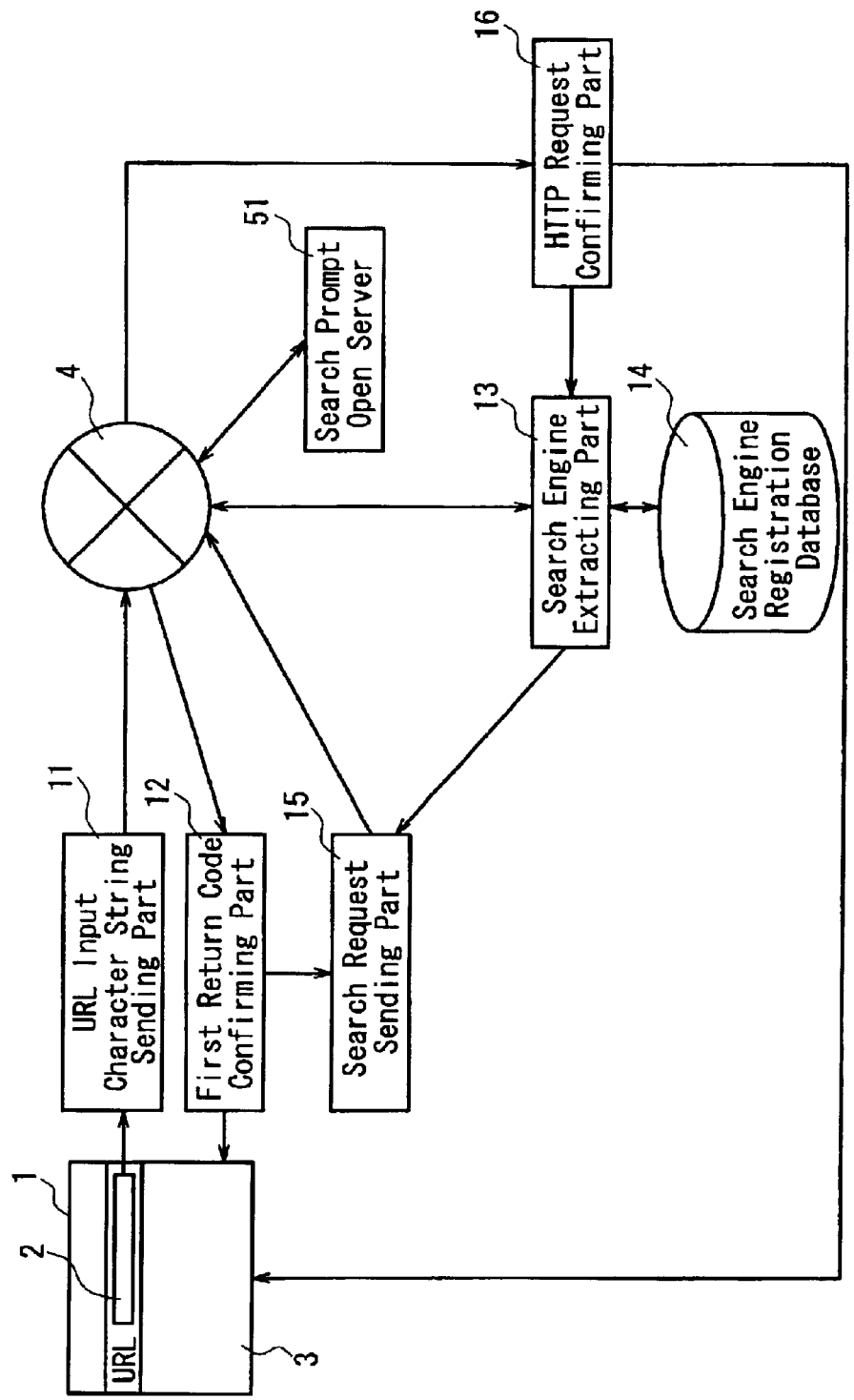
FIG. 5 is a view showing a configuration of an Internet search supporting apparatus of another example according to the present invention.

It is also considered that a search prompt open server 51 on the Internet is provided. As shown in FIG. 5, the search prompt open server 51 keeps the specification of a search prompt in the latest state with respect to all the accessible search engines in the Internet environment. When the specification of a search prompt is changed with respect to a predetermined search engine, the search prompt open server 51 updates the search engine registration database 14 or the search script storing part 32 in all the Internet search supporting apparatuses that are being used.

The method for updating the specification of a search prompt corresponding to a search engine is not particularly limited to the above method, and any method capable of updating the specification without allowing a user to be aware of it can be used.

Figure 6:
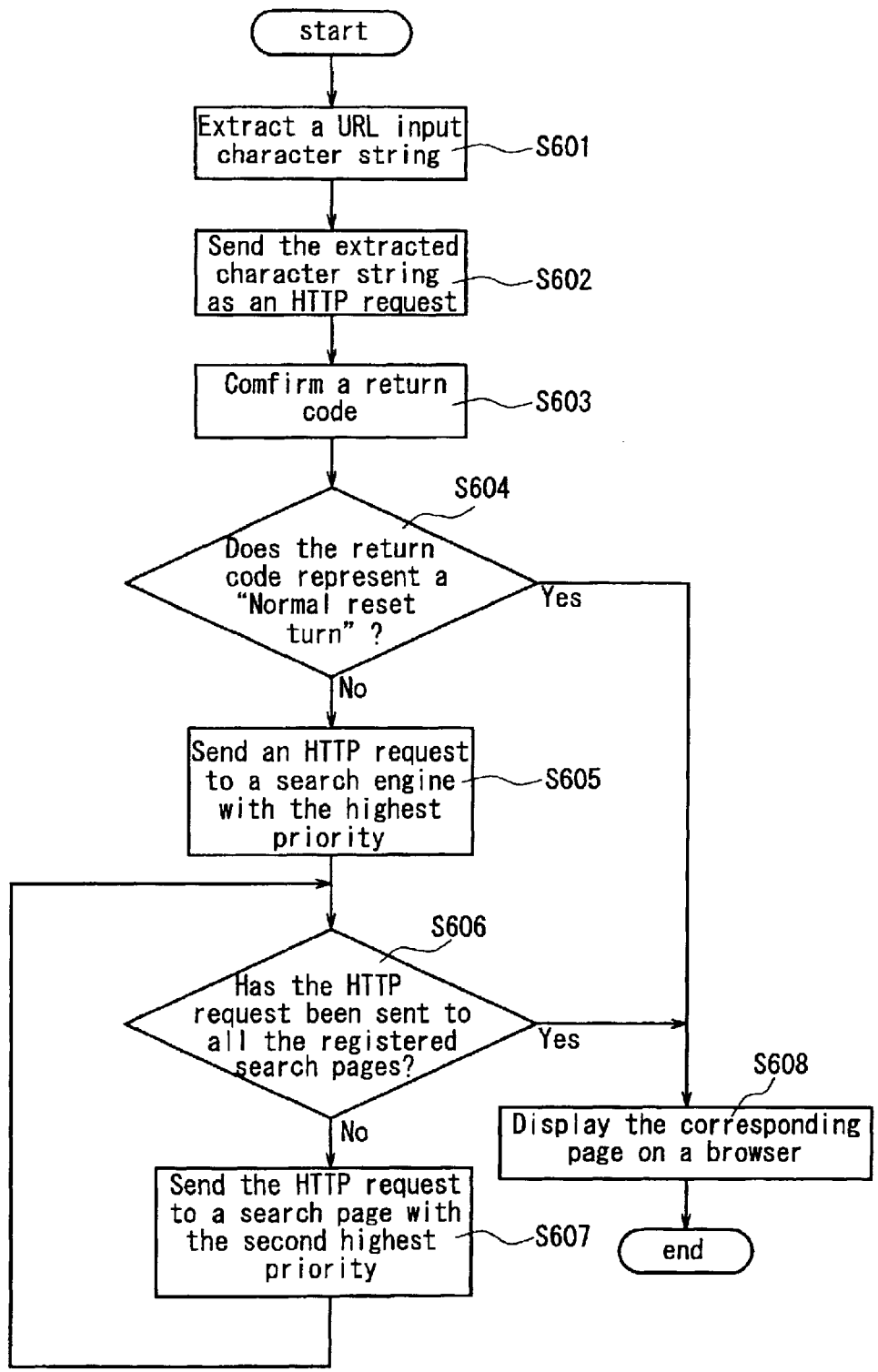
FIG. 6 is a flow chart illustrating processing in the Internet search supporting apparatus of the embodiment according to the present invention.

Next, a flow of processing for realizing an Internet search supporting apparatus of an embodiment according to the present invention will be described. FIG. 6 shows a flow chart showing processing of a program for realizing an Internet search supporting method of the embodiment according to the present invention.

In FIG. 6, a character string input in the URL name input region 2 is extracted (Operation 601), and the extracted character string is sent as an HTTP request (Operation 602). A return code with respect to the HTTP request is confirmed (Operation 603).

In the case where such a return code does not represent a "normal return" (Operation 604: No), it is determined that a search prompt is input in the URL name input region 2, and a search request with the same contents is sent to a search engine with the highest priority to the user (Operation 605).

Then, whether or not the search requests have been sent to all the search engines is confirmed (Operation 606). In the case where there remains a search engine to which the search request has not been sent (Operation 606: No), the search request is sent in the order from a high priority (Operation 607).

Finally, in the case where a return code with respect to the first HTTP request represents a "normal return" (Operation 604: Yes), the corresponding web page is displayed on a browser (Operation 608). Alternatively, in the case where search requests have been sent to all the search engines (Operation 606: Yes), search results of one or a plurality of search pages are displayed on a browser (Operation 608).

As described above, in the present embodiment, an HTTP request is issued unconditionally based on only the character string input in the URL input region in the case where a search is conducted using the Internet, whereby whether or not a search is a web page search or a character string search can be determined in accordance with a return code. Therefore, it is not required to provide character string input regions separately for a web page display and a web page search, and it is not required to switch a search screen. Thus, a search operation can be simplified. Furthermore, it also becomes possible to reduce the load of processing of generating a search script corresponding to a search engine by the user.

Furthermore, a user can search for information with respect to all the previously specified search engines without being aware of a search engine. Thus, it becomes possible to confirm the presence of information necessary to the user without causing search omission.

Figure 7:
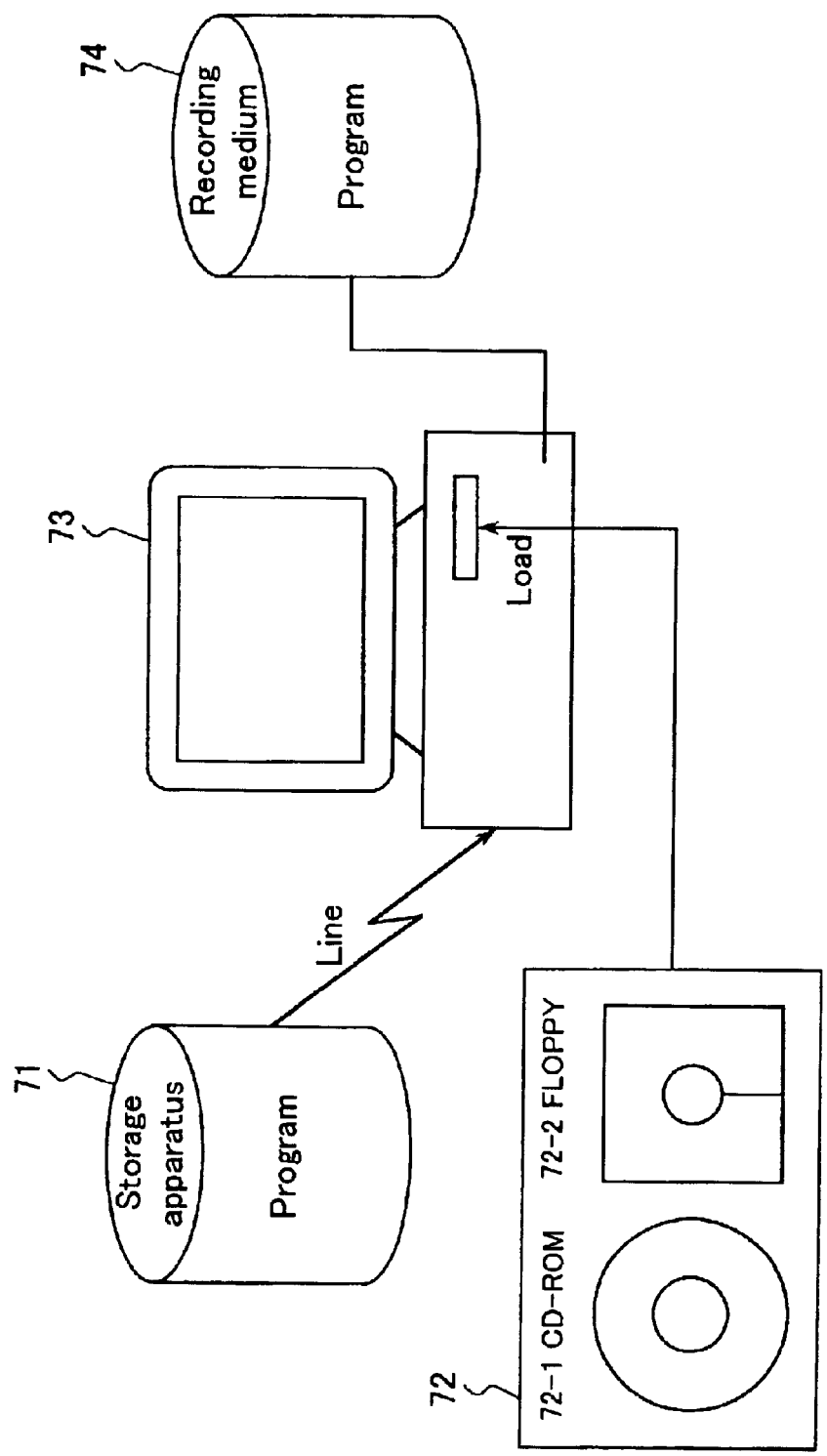
FIG. 7 illustrates examples of a recording medium.

A program for realizing the Internet search supporting method of the embodiment according to the present invention may be stored not only in a portable recording medium 72 such as a CD-ROM 72-1 and a flexible disk 72-2, but also in another storage apparatus 71 provided at the end of a communication line, or a recording medium 74 such as a hard disk and a RAM of a computer 73, as shown in FIG. 7. During execution, the program is loaded and executed on a main memory.

Furthermore, a search engine registration database or the like generated by the Internet search supporting apparatus of the embodiment according to the present invention may be stored not only in a portable recording medium 72 such as a CD-ROM 72-1 and a flexible disk 72-2, but also in another storage apparatus 71 provided at the end of a communication line, or a recording medium 74 such as a hard disk and a RAM of a computer 73, as shown in FIG. 7. For example, the search engine registration database can be read by the computer 73 when the Internet search supporting apparatus of the present invention is utilized.

As described above, according to the Internet search supporting apparatus of the present invention, an HTTP request is issued unconditionally based on only the character string input in the URL input region in the case where a search is conducted using the Internet, whereby whether or not a search is a web page search or a character string search can be determined in accordance with a return code. Therefore, it is not required to provide character string input regions separately for a web page display or a web page search, and it is not required to switch a search screen. Thus, a search operation can be simplified. Furthermore, it also becomes possible to reduce the load of processing of generating a search script corresponding to a search engine by a user.

Furthermore, a user can search for information with respect to all the previously specified search engines without being aware of a search engine. Thus, it becomes possible to confirm the presence of information necessary to the user without causing search omission.

The invention may be embodied in other forms without departing from the spirit or essential characteristics thereof.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for supporting an Internet search, comprising:

obtaining a character string input in a URL input region in a browser using an Internet search;

generating a search request using the obtained character string and a search script in a search script storing part for storing a search script corresponding to a search engine, and sending the search request to the search engine;

confirming a return code with respect to the search request; and in a case in which it is confirmed that the return code does not represent a "normal return", determining that a specification of the search script is changed in the search engine to which the search request has been sent, obtaining the changed search script from the search engine, and storing the changed search script in the search script storing part.

2. A method supporting an Internet search, comprising:

obtaining a character string input in a URL input region and sending an HTTP request in a browser using an Internet search;

a confirming process of confirming a return code with respect to the HTTP request;

a search engine extracting process of referring to a search engine registration database in which a plurality of search engines are registered with an order of priority specified by a user, and extracting the registered search engines;

automatically generating a search script corresponding to a search engine based on the obtained character string; and a request sending process of generating a search request using the generated search script, and sending the search request to the search engine, wherein, in a case in which the return code with respect to the HTTP request does not represent a "normal return" in the confirming process, it is determined that a search prompt is input in the URL input region, and the search request is sent to a search engine with a highest priority to the user, among search engines extracted in the search engine extracting process, in the request sending process.

3. The method supporting an Internet search according to claim 2, further comprising:

determining whether or not the search request has been sent to all the search engines registered in the search engine registration database, continuing to send the search request to a search engine with a highest priority among search engines that have not received the search request until the search request confirming part determines that the search request has been sent to all the search engines registered in the search engine registration database.

4. An Internet search supporting apparatus, comprising:

a URL input character string obtaining part obtaining a character string input in a URL input region in a browser using an Internet search;

a search script storing part storing a search script corresponding to a search engine;

a search request sending part generating a search request using the character string obtained in the URL input character string obtaining part and the search script, and sending the search request to the search engine;

a search request return code confirming part confirming a return code with respect to the search request; and a search script specification obtaining part, in a case in which the search request return code confirming part confirms that the return code with respect to the search request does not represent a "normal return", determining that a specification of the search script is changed in the search engine to which the search request has been sent, obtaining the changed search script from the search engine, and storing the changed search script in the search script storing part.

5. An Internet search supporting apparatus, comprising:

a URL input character string sending part for obtaining a character string input in a URL input region and sending an HTTP request in a browser using an Internet search;

an HTTP return code confirming part for confirming a return code with respect to the HTTP request;

a search engine extracting part referring to a search engine registration database in which a plurality of search engines are registered with an order of priority specified by a user, and extracting the registered search engines;

a search script generating part automatically generating a search script corresponding to a search engine based on the obtained character string; and a search request sending part generating a search request using the generated search script, and sending the search request to the search engine, wherein in a case in which the HTTP return code confirming part confirms that the return code with respect to the HTTP request does not represent a "normal return", it is determined that a search prompt is input in the URL input region, and the search request sending part sends the search request to a search engine with a highest priority to the user, among the extracted search engines.

6. The Internet search supporting apparatus according to claim 5, further comprising:

a search request confirming part for determining whether or not the search request has been sent to all the search engines registered in the search engine registration database, wherein the search request sending part continues to send the search request to a search engine with a highest priority among search engines that have not received the search request until the search request confirming part determines that the search request has been sent to all the search engines registered in the search engine registration database.

7. A program recording medium storing a program readable by a computer for controlling the computer to perform an Internet search, by:

obtaining a character string input in a URL input region in a browser using an Internet search;

generating a search request using the obtained character string and a search script in a search script storing part for storing a search script corresponding to a search engine, and sending the search request to the search engine;

confirming a return code with respect to the search request; and in a case in which it is confirmed that the return code does not represent a "normal return", determining that a specification of the search script is changed in the search engine to which the search request has been sent, obtaining the changed search script from the search engine, and storing the changed search script in the search script storing part.

8. A computer-executable recording medium storing a program controlling the computer to perform an Internet search supporting method, by:

obtaining a character string input in a URL input region and sending an HTTP request in a browser using an Internet search;

confirming a return code with respect to the HTTP request;

performing search engine extracting, comprising referring to a search engine registration database in which a plurality of search engines are registered, with an order of priority specified by a user, and extracting the registered search engines;

automatically generating a search script corresponding to a search engine based on the obtained character string;

performing request sending, comprising generating a search request using the generated search script and sending the search request to the search engine; and determining, in a case in which the return code with respect to the HTTP request does not represent a "normal return", that a search prompt is input in the URL input region in the confirming and sending the search request to a search engine with a highest priority to the user among the extracted search engines in performing the request sending.

9. The computer-executable recording medium storing a program for realizing an Internet search supporting method according to claim 5, the program controlling the computer to perform an Internet search by, further:

determining whether or not the search request has been sent to all the search engines registered in the search engine registration database; and continuing to send the search request to a search engine with a highest priority among search engines that have not received the search request until it is determined that the search request has been sent to all the search engines registered in the search engine registration database.

* * * * *

UNITED STATES PATENT AND TRADEMARK OFFICE
CERTIFICATE OF CORRECTION

| | |
|---|---|
| PATENT NO. | : 6,941,296 B2 |
| APPLICATION NO. | : 10/200159 |
| DATED | : September 6, 2005 |
| INVENTOR(S) | : Kazuhiro Maeno |

It is certified that error appears in the above-identified patent and that said Letters Patent is hereby corrected as shown below:

Column 10,
Line 13, change "claim 5" to -- claim 8 --.

Signed and Sealed this

Twenty-seventh Day of June, 2006

JON W. DUDAS
*Director of the United States Patent and Trademark Office*